US007099750B2

(12) United States Patent
Miyazawa et al.

(10) Patent No.: US 7,099,750 B2
(45) Date of Patent: Aug. 29, 2006

(54) DATA ACCESS METHOD AND DATA ACCESS APPARATUS FOR ACCESSING DATA AT ON-VEHICLE INFORMATION DEVICE

(75) Inventors: Hirohisa Miyazawa, Zama (JP); Gaku Sone, Yokohama (JP); Seiichi Kozaki, Yokohama (JP)

(73) Assignees: Xanavi Informatics Corporation, Zama (JP); Nissan Motor Co., Ltd., Yokohama (JP)

( * ) Notice: Subject to any disclaimer, the term of this patent is extended or adjusted under 35 U.S.C. 154(b) by 295 days.

(21) Appl. No.: 10/724,204

(22) Filed: Dec. 1, 2003

(65) Prior Publication Data

US 2004/0111189 A1 Jun. 10, 2004

(30) Foreign Application Priority Data

Nov. 29, 2002 (JP) ............... 2002-348211

(51) Int. Cl.
*G05D 1/00* (2006.01)
(52) U.S. Cl. .............. 701/1; 701/29; 701/35; 701/36; 340/438; 340/439
(58) Field of Classification Search ............ 701/1, 701/29, 33, 35, 36; 340/426.13, 425.5, 438, 340/439
See application file for complete search history.

(56) References Cited

U.S. PATENT DOCUMENTS

| 4,694,408 A | 9/1987 | Zaleski |
| 4,831,560 A | 5/1989 | Zaleski |
| 5,278,759 A | 1/1994 | Berra et al. |
| 6,542,077 B1 * | 4/2003 | Joao ............ 340/426.16 |
| 2004/0138790 A1 * | 7/2004 | Kapolka et al. ....... 701/29 |

FOREIGN PATENT DOCUMENTS

| DE | 3723024 | 1/1989 |
| JP | 58-214436 | 12/1983 |
| JP | 63-223901 | 9/1988 |
| JP | 10-333899 | 12/1998 |
| JP | 2000-181698 | 6/2000 |
| JP | 2002-111699 | 4/2002 |

OTHER PUBLICATIONS

D. Bergmann et al., "Reduzierung der Variantenvielfalt elektronisher Steuergeräte durch Programmierung am Montageband des Automobilherstellers" ("Reduction That Variant Variety of Elektronisher Controllers by Programming at the Assembly Belt of the Car Manufacturer"), VDI-Berichte (VDI-Reports), Sep. 8, 1988, pp. 97-109, XP-002333463.

K. Gebhardt et al., "Das Opel-Diagnose-Konzept aus der Sicht des Entwicklers-Status und zukünfitge Anforderungen" ("The OPEL Diagnostic Concept from the View of the Developer Status and Future Requirements"), VDI-Berichte (VDI-Reports), Sep. 8, 1988, pp. 349-268, XP-002333464.

European Search Report dated Jul. 15, 2005.

* cited by examiner

*Primary Examiner*—Gertrude A. Jeanglaude
(74) *Attorney, Agent, or Firm*—Crowell & Moring LLP

(57) ABSTRACT

In a data access method for accessing data in an on-vehicle information device having an on-vehicle memory unit that allows data stored therein to be read out and overwritten by an external apparatus and an on-vehicle control unit that executes a data read and a data overwrite by controlling the on-vehicle memory unit, supplying power to the on-vehicle information device from the external apparatus when a power switch at the on-vehicle information device is in an OFF state, and reading out the data in the on-vehicle memory unit and overwriting the data through control implemented by the external apparatus.

6 Claims, 8 Drawing Sheets

DATA ACCESS METHOD AND DATA ACCESS APPARATUS FOR ACCESSING DATA AT ON-VEHICLE INFORMATION DEVICE

INCORPORATION BY REFERENCE

The disclosure of the following priority application is herein incorporated by reference: Japanese Patent Application No. 2002-348211 filed Nov. 29, 2002

BACKGROUND OF THE INVENTION

1. Field of the Invention

The present invention relates to a technology whereby data recorded in an on-vehicle information device such as a navigation system are accessed by connecting a data access apparatus to the on-vehicle information device.

2. Description of the Related Art

In some of the navigation systems in the related art that allow map data, program data and the like to be updated by overwriting them whenever necessary, the data are recorded in a hard disk. In the related art, the data are overwritten in such a navigation system by connecting a hard disk having recorded therein data to be used for the update into a special slot. Over the approximately 40 minutes that it takes to execute the overwrite, power must be supplied to the navigation system from the vehicle battery. In order to assure enough battery capacity to supply the power to the navigation system for these 40 minutes, the vehicle engine must be left running. Thus, the vehicle engine cannot be turned off for other operational reasons during the data overwrite operation, leading to a problem in that the data overwrite can sometimes be an inconvenient and awkward operation.

SUMMARY OF THE INVENTION

The present invention provides a system that facilitates a data overwrite operation executed to update the information in an information device in an ideal manner.

In the data access method according to the present invention, which is adopted in an on-vehicle information device having an on-vehicle memory unit that allows data stored therein to be read out and overwritten by an external apparatus and an on-vehicle control unit that executes a data read and a data overwrite by controlling the on-vehicle memory unit, power is supplied to the information device from the external apparatus and the data in the on-vehicle memory unit are read out and overwritten through control implemented by the external apparatus when a power switch of the information device is in an OFF state.

It is desirable that when the power switch of the information device is in an ON state, the on-vehicle memory unit is controlled by the on-vehicle control unit until a data read or a data overwrite is started by the external apparatus and that once the data read or the data overwrite starts, the data in the on-vehicle memory unit is read out and overwritten through control implemented by the external apparatus in this data access method.

In addition, in the data access method, the information device should preferably disallow the control of the on-vehicle memory unit by the on-vehicle control unit when the data in the on-vehicle memory unit are read out or overwritten through control implemented by the external apparatus.

It is also desirable that when the data in the on-vehicle memory unit are read out or overwritten through the control implemented by the external apparatus, the state of control in which the on-vehicle memory unit is controlled by the external apparatus is indicated.

Furthermore, in the data access method, the information device should be preferably connected with the external apparatus via a mounting slot for a portable external storage device.

The on-vehicle information device according to the present invention is realized by using the data access method described above.

The data access apparatus according to the present invention, which is connected to the information device, includes an external memory unit that stores therein data to be used to overwrite data stored in the on-vehicle memory unit and a control unit that reads out data in the on-vehicle memory unit and overwrite the data in the on-vehicle memory unit with data stored in the external memory unit by controlling the external memory unit and the on-vehicle memory unit.

It is desirable that the data access apparatus further include a display unit that receives and displays attributes of the information device transmitted by the information device prior to reading out and overwriting the data in the on-vehicle memory unit.

The data access system according to the present invention comprises an on-vehicle information device having an on-vehicle memory unit that allows data stored therein to be read out and overwritten from the outside, an on-vehicle control unit that executes a data read and a data overwrite by controlling the on-vehicle memory unit and an on-vehicle interface unit that executes a conversion of a control signal exchanged between the on-vehicle memory unit and the on-vehicle control unit, and a data access apparatus having an external memory unit having stored therein data to be used to overwrite data in the on-vehicle memory unit, an external control unit that reads out data in the on-vehicle memory unit and overwrites the data in the on-vehicle memory unit with data in the external memory unit by controlling the external memory unit and the on-vehicle memory unit and an external interface unit that converts a control signal input and output between the external and on-vehicle memory unit and the on-vehicle control unit. The information device further includes a selector switch that selects the on-vehicle control unit and the on-vehicle interface unit to be connected with the on-vehicle memory unit until the data access apparatus outputs a changeover command and allows the external control unit and the external interface unit to be connected with the on-vehicle memory unit after the changeover command is output.

DESCRIPTION OF THE PREFERRED EMBODIMENTS

First Embodiment

Figure 1:
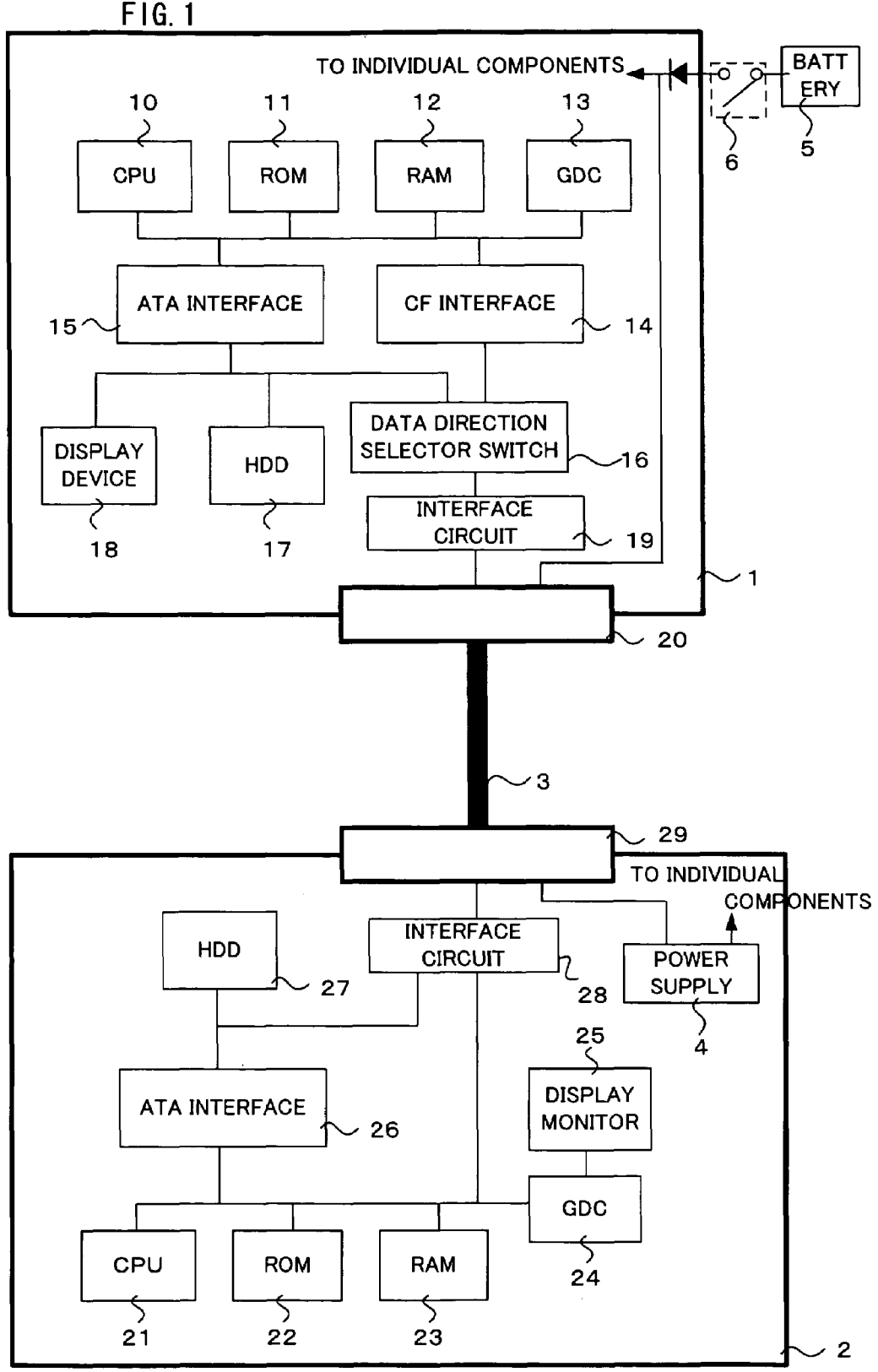
FIG. 1 shows the structure of the data overwrite system achieved in first and second embodiments.

FIG. 1 shows the first embodiment in which the present invention is adopted in a data overwrite system. The system shown in FIG. 1 executes a data overwrite by connecting an overwrite device to a car navigation system. A car navigation system (hereafter referred to as an on-vehicle device) 1 provides various types of information such as a map showing the route to a destination to the user based upon map data, a program and the like stored in a hard disk (hereafter referred to as an HDD) 17. The data stored in the HDD 17 can be partially or entirely overwritten by using overwrite data stored at an overwrite device 2.

The on-vehicle device 1 comprises a CPU 10, a ROM 11, a RAM 12, a GDC (graphic display controller) 13, a CF (compact flash) interface 14, an ATA (AT attachment) interface 15, a data direction selector switch 16, the HDD 17, a display device 18, an interface circuit 19 and a connector 20. The CPU 10 executes various types of processing such as a map data read out from the HDD 17 in conformance to the program stored in the ROM 11 or the HDD 17. The RAM 12 is utilized to save data on a temporary basis while the CPU 10 executes processing. The GDC 13 executes graphic display at a display monitor (not shown) in conformance to control implemented by the CPU 10. For instance, it displays a map based upon the map data stored in the HDD 17. The CF interface 14 executes various types of interface processing in conformance to control implemented by the CPU 10 when data are exchanged between any of various types of devices conforming to the CF specifications that is connected to the connector 20 and the CPU 10.

The ATA interface 15 executes various types of interface processing in conformance to control implemented by the CPU 10 when data stored in the HDD 17 are read out or when data are written into the HDD 17. Such interface processing is executed in a method stipulated by the ATA specifications which constitute a standard HDD control protocol.

The data direction selector switch 16 switches the data input/output destinations (exchange partners) of the HDD 17. One of the exchange partners that may be selected to is the overwrite device 2. When the overwrite device 2 is selected as the data exchange partner of the HDD 17, the overwrite device 2 exchanges data with the HDD 17 via the connector 20. The other exchange partner that may be selected to is the CPU 10. When the CPU 10 is selected as the data exchange partners of the HDD 17, the CPU 10 exchanges data with the HDD 17 via the ATA interface 15. When navigation processing or the like is executed by using the on-vehicle device 1, the data exchange partner of the HDD 17 will have been switched to the latter partner, i.e., the CPU 10, through the data direction selector switch 16. The data exchange partner of the HDD 17 can be switched to the former partner, i.e., the overwrite device 2, via the data direction selector switch 16. At this setting, the overwrite device 2 is able to read out or overwrite data stored in the HDD 17. The changeover operation at the data direction selector switch 16 is to be explained in detail later.

In the HDD 17, various types of data including the map data and the program are stored, and the stored data can be read out or new data can be written into the HDD 17 as necessary. The data in the HDD 17 are read out and new data are written into the HDD 17 in conformance to the control implemented by the CPU 10 via the ATA interface 15 as explained earlier. In addition, by changing the setting selected at the data direction selector switch 16, the data in the HDD 17 can be read out and new data can be written into the HDD 17 by the overwrite device 2 as well.

The display device 18 indicates that the HDD 17 is engaged in operation when it is on. The display device 18 maybe constituted of, for instance, an LED. Alternatively, the display device 18 may be constituted of a liquid crystal panel to indicate to the operating state of the HDD 17 through liquid crystal display or the like. The interface circuit 19 achieves an electrical interface for various types of signals exchanged between an external device connected to the connector 20 and the on-vehicle device 1.

Any of various types of recording media and devices conforming to the CF specifications, e.g, a CF memory card, may be connected to the connector 20. The connector 20 is provided to be used as a mounting slot at which a portable external storage device is connected. Alternatively, the overwrite device 2 may be connected to the connector 20 by using a cable 3. By connecting, for instance, a CF memory card to the connector 20, the on-vehicle device 1 can share various navigation related settings and music data with another on-vehicle device, a PC or the like. When the overwrite device 2 is connected to the connector 20, the data stored in the HDD 17 can be read out or overwritten by using the overwrite device 2 as described earlier. It is to be noted that the connector 20 is located at the front surface of the instrument panel (not shown) of the vehicle.

Power is supplied to the on-vehicle device 1 from a battery 5 of the vehicle. The power from the battery 5 is supplied to the various components of the on-vehicle device 1. The power supply from the battery 5 is turned on or off via a power switch 6 at the vehicle. The power switch 6 is turned on/off by, for instance, changing the ignition key position or turning the ignition key.

The overwrite device 2 comprises a power supply 4, a CPU 21, a ROM 22, a RAM 23, a GDC 24, a display monitor 25, an ATA interface 26, an HDD 27, an interface circuit 28 and a connector 29. As does the CPU 10 of the on-vehicle device 1, the CPU 21 executes various types of processing to read out and overwrite the data at the on-vehicle device 1 in conformance to a program stored in the ROM 22 or the HDD 27. The RAM 23 is used to save data on a temporary basis while the CPU 21 executes processing. The GDC 24 executes graphic display at the display monitor 25 in conformance to control implemented by the CPU 21. The progress status of a data read or a data overwrite executed at the on-vehicle device 1, for instance, is displayed at the display monitor 25.

The ATA interface 26 executes various types of interface processing in conformance to control implemented by the CPU 21 when data stored in the HDD 27 are read out or when data are written into the HDD 27. In addition, the ATA interface 26 executes interface processing to achieve an interface between the HDD 17 and the CPU 21 when the data stored in the HDD 17 are read out or overwritten by the overwrite device 2. Such interface processing is executed in a method stipulated by the ATA specifications as is the processing executed at the ATA interface 15.

Data to be written into the HDD 17 when overwriting the data at the HDD 17 are stored in the HDD 27. The data stored in the HDD 27 are copied into the HDD 17 through control implemented by the CPU 21. In addition, various types of data such as a program used to engage the overwrite device 2 in operation are stored in the HDD 27, and the data stored in the HDD 27 are read out or new data are written into the HDD 27 as necessary. The data in the HDD 27 are read out and new data are written into the HDD 27 in conformance to control implemented by the CPU 21 via the ATA interface 26, in a manner similar to that described earlier.

The interface circuit 28 achieves an electrical interface for various signals exchanged between the on-vehicle device 1 connected to the connector 29 and the overwrite device 2. The cable 3 is connected to the connector 29. The overwrite device 2 is connected to the on-vehicle device 1 via the cable 3.

Power is supplied from the power supply 4 to the various components of the overwrite device 2. The power supply 4 may be, for instance, a battery mounted at the overwrite device 2, or it may be constituted in the form of a plug connected to a power supply source located outside the overwrite device 2. In addition, the power supply 4 supplies power to the on-vehicle device 1 via the cable 3 as well.

Figure 2:
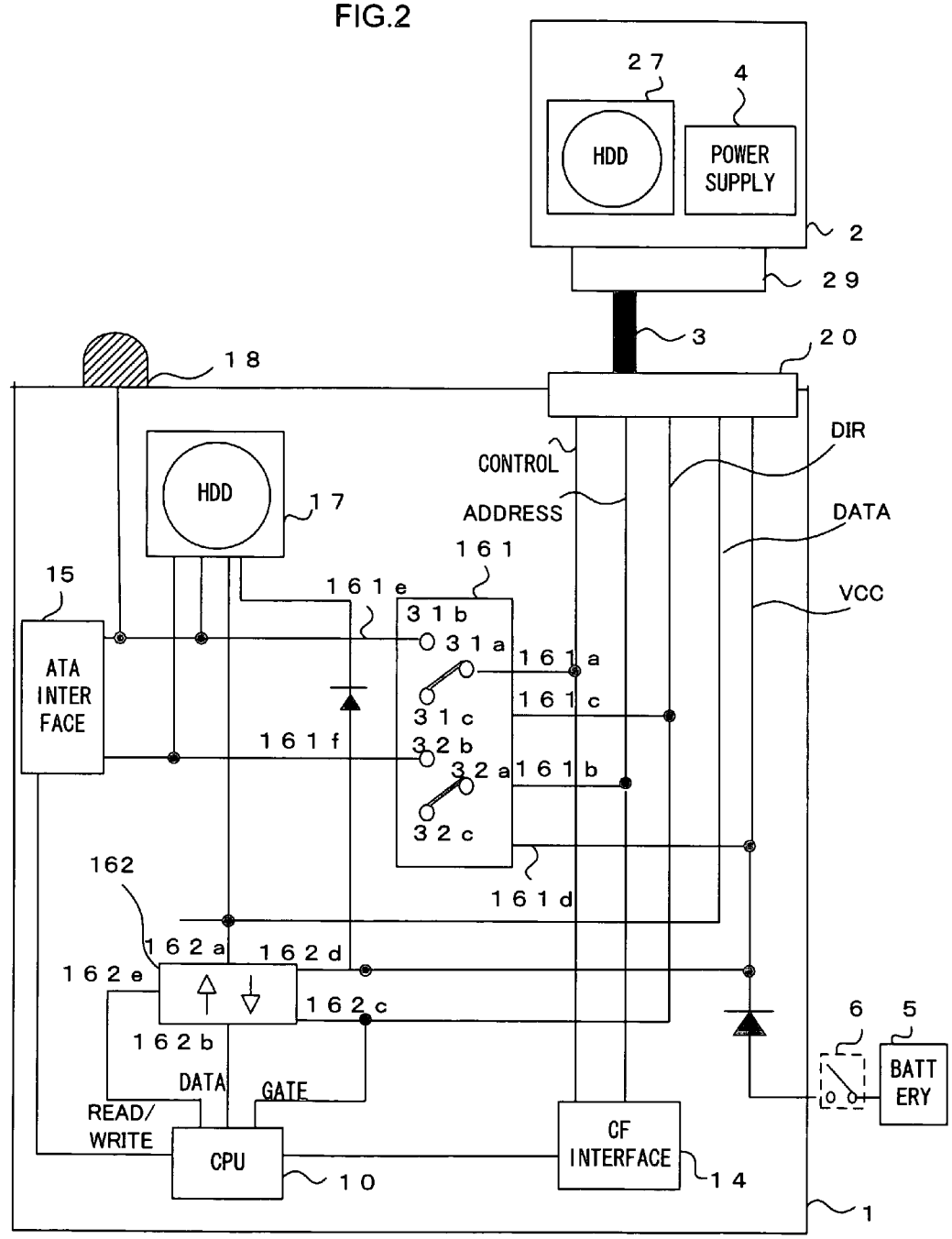
FIG. 2 illustrates the operation of the data direction selector switch executed when data at the on-vehicle device are overwritten by the overwrite device.

The changeover operation at the data direction selector switch 16 executed when reading out or overwriting the data stored in the HDD 17 of the on-vehicle device 1 by utilizing the overwrite device 2 is now explained in reference to FIG. 2. As the data direction selector switch 16 is switched over, the overwrite device 2 connected to the connector 20 via the cable 3 is enabled to read out the contents of the data stored in the HDD 17. In addition, the overwrite data recorded in the HDD 27 can be copied into the HDD 17 to overwrite the data in the HDD 17. It is to be noted that FIG. 2 does not include illustrations of the components shown in FIG. 1 that are not relevant to the explanation of the changeover operation at the data direction selector switch 16.

The data direction selector switch 16 is constituted of two types of switches, i.e., a switch 161 and a switch 162. The switch 161 switches the recipients of a control signal and an address signal output by the overwrite device 2. The switch 162 switches the data exchange directions in which data are exchanged between the HDD 17 and the CPU 10. Next, the changeover operations of the switch 161 and the switch 162 are individually explained.

At the switch 161, the control signal, the address signal and a DIR signal output from the overwrite device 2 are respectively input to terminals 161a, 161b and 161c. In addition, terminals 161e and 161f are connected to the HDD 17. As the DIR signal is output and also a switching key to be detailed later is output as the address signal from the overwrite device 2, changeovers occur at the two switches at the switch 161 from a contact point 31c to a contact point 31b and from a contact point 32c to a contact point 32b. As a result, the terminals 161a and 161b become respectively connected with the terminals 161e and 161f to allow the control signal and the address signal to be output to the HDD 17. In this state, the HDD 17 is controlled by the overwrite device 2 and the control of the HDD 17 by the CPU 10 is disallowed.

The control signal and the address signal, which conform to the ATA specifications, are used to control the HDD 17 and the HDD 27. The control signal is used to control the operating states of the HDDs. The control signal may be, for instance, a master/slave signal that specifically indicates whether the target HDD is a master or a slave. The address signal indicates the specific address for data to be written into an HDD or for data to be read out from an HDD. In addition, the DIR signal is output by the overwrite device 2 when reading out or overwriting data stored in the HDD 17 of the on-vehicle device 1 by using the overwrite device 2.

It is to be noted that power is supplied from the overwrite device 2 or the battery 5 to a terminal 161d of the switch 161. The power supplied by the overwrite device 2 enables the switch 161 to engage in operation even when the power switch 6 is not in an ON state.

The terminal 161e of the switch 161 is also connected with the display device 18. Thus, the display device 18 is turned on by the control signal output to the HDD 17 while the contact points 31a and 31b of the switch 161 are closed to indicate that the HDD 17 is being accessed. The switch 161 also outputs a signal (not shown) indicating its current changeover state to the display device 18. Based upon this signal, the display mode of the display device 18, e.g., the color of the LED that becomes lit, can be changed in correspondence to the changeover state at the switch 161. Consequently, the display device 18 is enabled to indicate to the user whether the CPU 10 inside the on-vehicle device or the overwrite device 2 is currently accessing the HDD 17.

The DIR signal output by the overwrite device 2 is input to a terminal 162c of the switch 162. In addition to the DIR signal, a gate signal output by the CPU 10 is input to the terminal 162c. A read/write signal output by the CPU 10 is input to a terminal 162e of the switch 162. It is to be noted that data from the HDD 17 or data to be written into the HDD 17 are input/output through a terminal 162a. Data from the CPU 10 or data to be provided to the CPU 10 are output/input through a terminal 162b. The switch 162 controls the data exchange direction of data passing between the terminals 162a and 162b and an operation for disallowing any data passage between the terminals 162a and 162b based upon the states of the DIR signal, the gate signal and the read/write signal.

When the terminal 162c is not controlled by the DIR signal from the overwrite device 2 or the gate signal from the CPU 10, data are allowed to pass along one direction only, i.e., either from the terminal 162a to the terminal 162b or from the terminal 162b to the terminal 162a at the switch 162. The direction along which the data are allowed to pass by the switch 162 is determined as described below, in conformance to the state of the read/write signal input to the terminal 162e. If the read/write signal is in a state that indicates a write, data are allowed to pass from the terminal 162b to the terminal 162a (the direction in which data are output from the CPU 10 to the HDD 17). If the read/write signal is in a state that indicates a read, data are allowed to pass from the terminal 162a to the terminal 162b (the direction along which data are output from the HDD 17 to the CPU 10).

When the terminal 162c is controlled by the DIR signal from the overwrite device 2 or the gate signal from the CPU 10, the switch 162 cuts off any data flow between the terminals 162a and 162b, regardless of the state of the read/write signal input to the terminal 162e. Thus, it is ensured that the CPU 10 does not interfere with any overwrite operation in progress between the overwrite device 2 and the HDD 17. It is to be noted that the DIR signal is output by the overwrite device 2 when reading out or overwriting data stored in the HDD 17 of the on-vehicle device 1 by using the overwrite device 2 as described earlier. In addition, the gate signal is output by the CPU 10 when the overwrite device becomes connected to the connector 20 and the power is turned on.

It is to be noted that power is supplied from the overwrite device 2 or the battery 5 to a terminal 162d of the switch 162. The power supplied by the overwrite device 2 enables the switch 162 to engage in operation even when the power switch 6 is not in an ON state as in the case of the switch 161.

As described above, by changing over the switch 161, the control signal and the address signal output by the overwrite device 2 can be directed to the HDD 17. In addition, the overwrite device 2 prevents any interference by the CPU 10 with an overwrite operation in progress between the overwrite device 2 and the HDD 17 by changing over the switch 162. The overwrite device 2 is enabled to directly control the HDD 17 in this manner so as to read out or overwrite data stored in the HDD 17.

Figure 3:
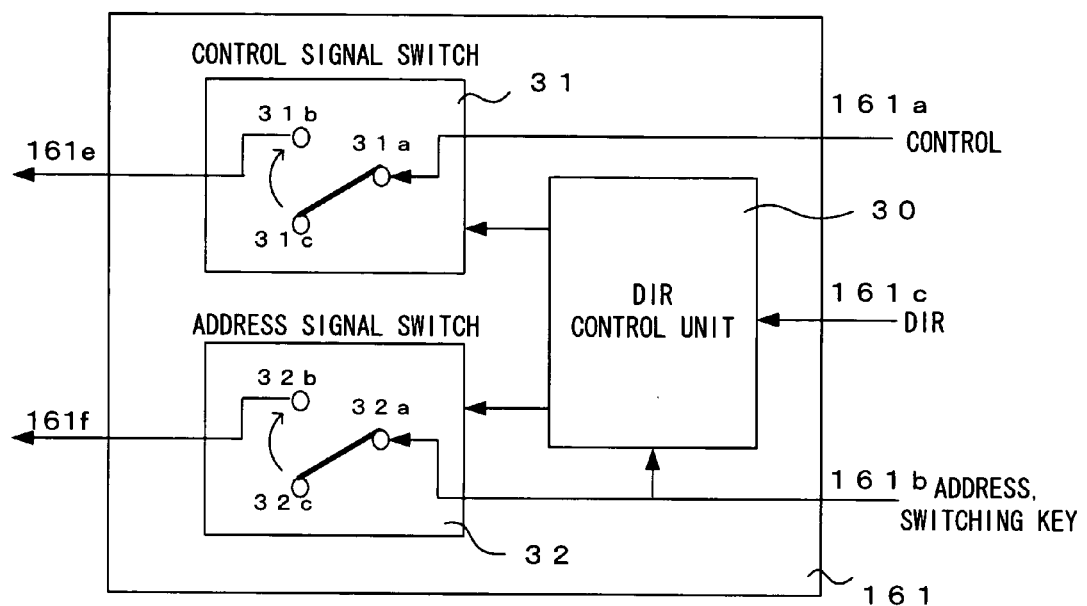
FIG. 3 illustrates the functional blocks of the switch used to switch the recipients to which the control signal and the address signal are output in the first embodiment.

The switching key output from the overwrite device 2 to the switch 161 is now explained in reference to the functional block diagram presented in FIG. 3. The switch 161 includes a DIR control unit 30, a control signal switch 31 and an address signal switch 32. Of these, the control signal switch 31 and the address signal switch 32 correspond to the two switches of the switch 161 shown in FIG. 2 (i.e., the switch that effects the changeover between the contact points 31b and 31c and the switch that effects the changeover between the contact points 32b and 32c).

The DIR control unit 30 monitors for a specific switching key input from the overwrite device 2 to the terminal 161b when the DIR signal is input to the terminal 161c. Once the specific switching key is input to the terminal 161b, the DIR control unit 30 switches the control signal switch 31 and the address signal switch 32 respectively from the contact point 31c to the contact point 31b and from the contact point 32c to the contact point 32b. As a result, the control signal and the address signal provided by the overwrite device 2 are output to the HDD 17 as explained earlier.

The signal constituting the switching key is a serial data transmitted from the overwrite device 2 to the terminal 161b in conformance to a constant clock cycle. It is to be noted that in addition to the switching key, a normal address signal conforming to the ATA standard is also input to the terminal 161b. The overwrite device 2 outputs the serial data achieving a predetermined specific bit pattern over the specific clock cycle as the switching key. The clock cycle of the switching key is faster than the clock cycle of the normal address signal. By using the switching key with a specific bit pattern, as described above, an inadvertent changeover due to noise is prevented, and by speeding up the clock cycle of the switching key, an error whereby the normal address signal is erroneously recognized as the switching key is prevented. The overwrite device 2 outputs the switching key described above to the terminal 161b of the switch 161 when reading out or overwriting data stored in the HDD 17.

Figure 8:
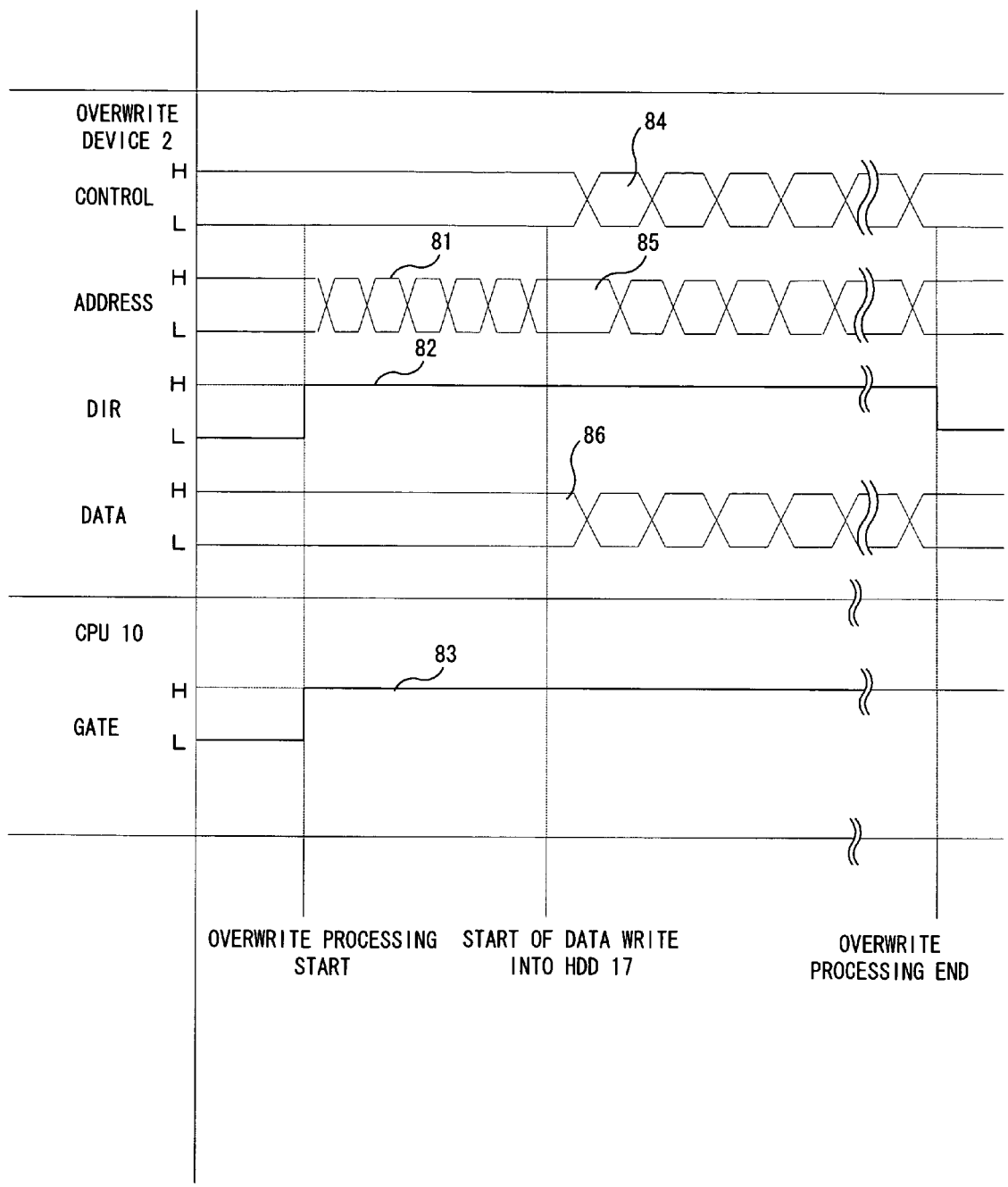
FIG. 8 is a timing chart representing an example of the timing with which signal are output by the CPU of the on-vehicle device and the overwrite device.

The various signals described above are output from the overwrite device 2 and the CPU 10 of the on-vehicle device 1 to the switches 161 and 162 when overwriting data in the HDD 17. The relationship among the individual signals achieved during this process is now explained by using the example presented in the timing chart in FIG. 8. It is to be noted that in FIG. 8, the horizontal axis represents the progress of the processing and the voltage level of each signal is indicated along the vertical axis. The voltage levels of the individual signals are each indicated as either "H" or "L" with "H" representing a high voltage level and "L" representing a low voltage level.

As the overwrite processing starts at the overwrite device 2, the switching key indicated by reference numeral 81 and the DIR signal indicated by reference numeral 82 are output by the overwrite device 2. In addition, the gate signal indicated by reference numeral 83 is output by the CPU 10.

Since the operational clock of the switching key 81 is faster than the operational clock of the address signal indicated by reference numeral 85 as explained earlier, the signal voltage changes over shorter time intervals. The switching key 81 and the DIR signal 82 are input to the switch 161 and the DIR signal 82 is also input to the switch 162.

As the switch 161 is changed over by the switching key 81 and the DIR signal 82, the control signal indicated by reference numeral 84, the address signal indicated by reference numeral 85 and the data indicated by reference numeral 86 are output from the overwrite device 2. It is to be noted that the DIR signal 82 and the gate signal 83 are continuously output respectively from the overwrite device 2 and the CPU 10. With the control signal 84 and the address signal 85, the HDD 17 of the on-vehicle device 1 is controlled so as to allow the data 86 to be written into the HDD 17.

Once the overwrite processing ends, the output of the various signals from the overwrite device 2 ends as well. However, the CPU 10 keeps outputting the gate signal 83, since the switches 161 and 162 have been changed over so as to disallow access to the HDD 17 by the CPU 10 and thus the CPU 10 cannot recognize the overwrite processing end. When the overwrite processing ends, the output of the gate signal 83 is stopped by restarting the CPU 10.

Next, the flows of the processing executed at the overwrite device 2 and the on-vehicle device 1 to overwrite the data in the HDD 17 by employing the overwrite device 2 in the data overwrite system in the first embodiment are explained.

Figure 4:
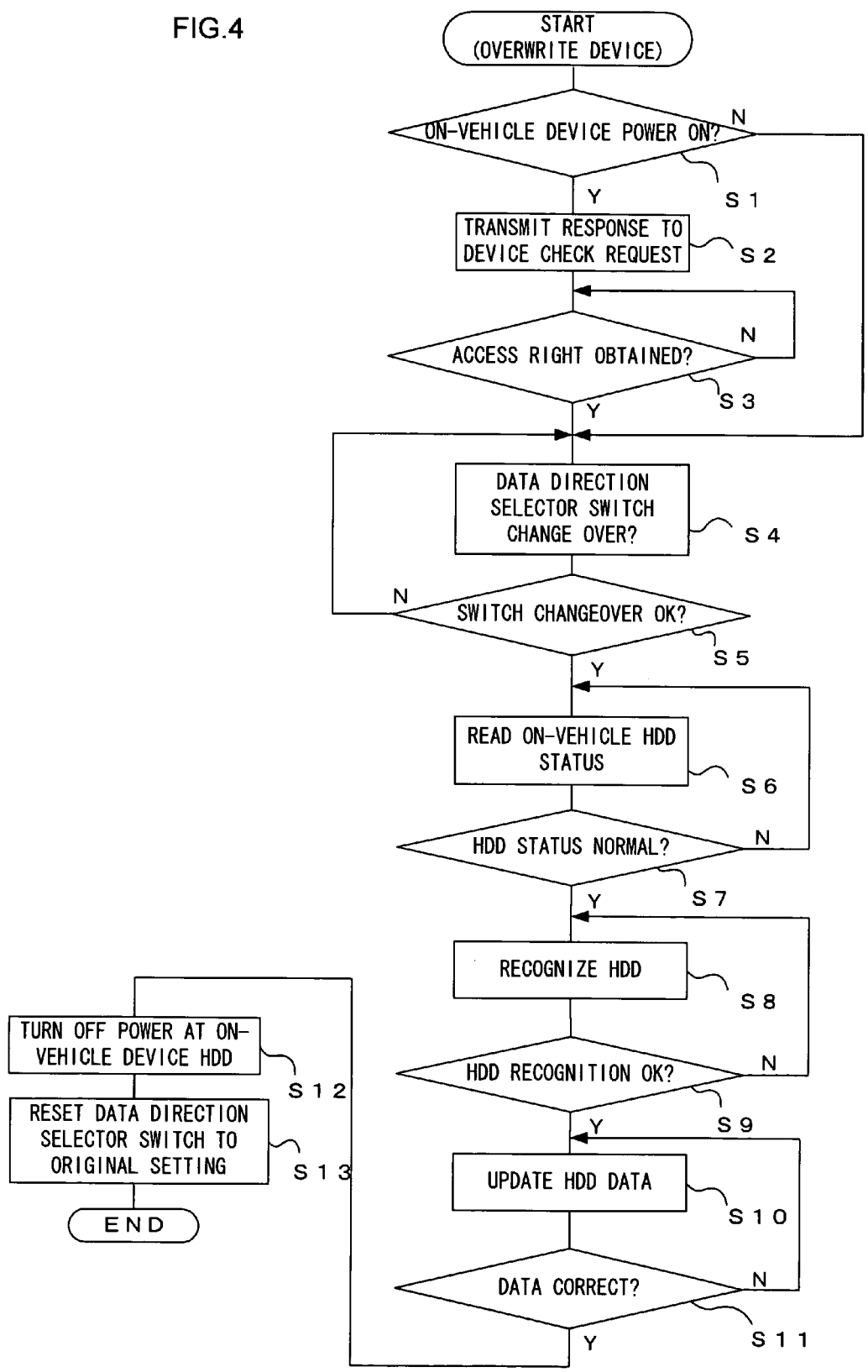
FIG. 4 presents a flowchart of the processing executed at the overwrite device in the first embodiment.

FIG. 4 shows the flow of the processing executed at the overwrite device 2. This processing flow is executed when the overwrite processing is selected through an operation of an operating member or the like (not shown) of the overwrite device 2, in conformance to the program executed at the CPU 21. In step S1, a decision is made as to whether or not the power switch at the on-vehicle device 1 is on. This decision is made by judging whether or not a device check request has been transmitted (step S21 in FIG. 5) to the overwrite device 2 from the on-vehicle device 1. If the device check request has been transmitted, it is decided that the power has been turned on, whereas it is decided that the power switch is in an OFF state if no such request has been transmitted. If the power has been turned on, the operation proceeds to step S2, whereas if the power switch is in an OFF state, the operation proceeds to step S4.

In step S2, a response to the device check request transmitted in step S1 is transmitted. This response includes data indicating that the device is a overwrite device. Upon receiving this response, the on-vehicle device 1 identifies the connected device as the overwrite device 2 (step S23 in FIG. 5) and executes processing for transferring access right to the HDD 17 to the overwrite device 2.

In step S3, a decision is made as to whether or not the access right to the HDD 17 having been held by the CPU 10 of the on-vehicle device 1 has been obtained. This decision is made by judging whether or not data indicating an access right transfer have been transmitted from the on-vehicle device 1 to the overwrite device 2 (step S25 in FIG. 5). If such data have been transmitted, it is judged that the access right has been obtained, whereas if no such data have been transmitted, it is judged that access right has not been obtained. The operation proceeds to step S4 if the access right has been obtained, whereas the operation in step S3 is repeatedly executed if the access right has not been obtained.

In step S4, the DIR signal is output to the switches 161 and 162 and, in addition, the switching key is transmitted to the switch 161. Through the processing in step S4, the switches 161 and 162 are changed over to enable the overwrite device 2 to control the HDD 17.

In step S5, a decision is made as to whether or not the switches 161 and 162 have been changed over. This decision is made based upon status signals (not shown) output from the switches 161 and 162. The operation proceeds to the following step S7 if it is decided that the switches have been changed over, whereas the operation returns to step S4 if it is decided that they have not been changed over.

In step S6, the status output by the HDD 17 is read via the ATA interface 26. In step S7, a decision is made as to whether or not the status read from the HDD 17 in step S6 is normal. The operation proceeds to the following step S8 if the status is judged to be normal, whereas the operation returns to step S6 again if the status is judged to be not normal. In step S8, the HDD 17 is recognized as a device that can be controlled via the ATA interface 26. At this time, the HDD 17 is recognized as a slave HDD and the HDD 27 is recognized as a master HDD. In step S9, a decision is made as to whether or not the HDD 17 has been recognized as a slave HDD in step S8. This decision is made by verifying the status output from the HDD 17. If the HDD 17 has been recognized as a slave HDD, the operation proceeds to the following step S10, but the operation returns to step S8 if the HDD 17 has not been recognized as such.

In step S10, the data in the HDD 17 are updated with the overwrite data stored in the HDD 27. This data update is executed by copying the data stored in the HDD 27 into the HDD 17 in part or in their entirety or by erasing data in the HDD 17 that have become no longer needed. Once the update of all the data is completed, the operation proceeds to step S11. In step S11, a decision is made as to whether or not the data in the HDD 17 updated in step S10 are correct. This decision is made by, for instance, comparing the data file sizes before and after the update or by executing a checksum. The operation proceeds to the following step S12 if the data are judged to be correct data, whereas the operation returns to step S10 if they are judged to be incorrect. In step S12, the power to the HDD 17 is turned off. In step S13, the switches 161 and 162 are changed over to set the switches 161 and 162 back to the pre-overwrite states.

Figure 5:
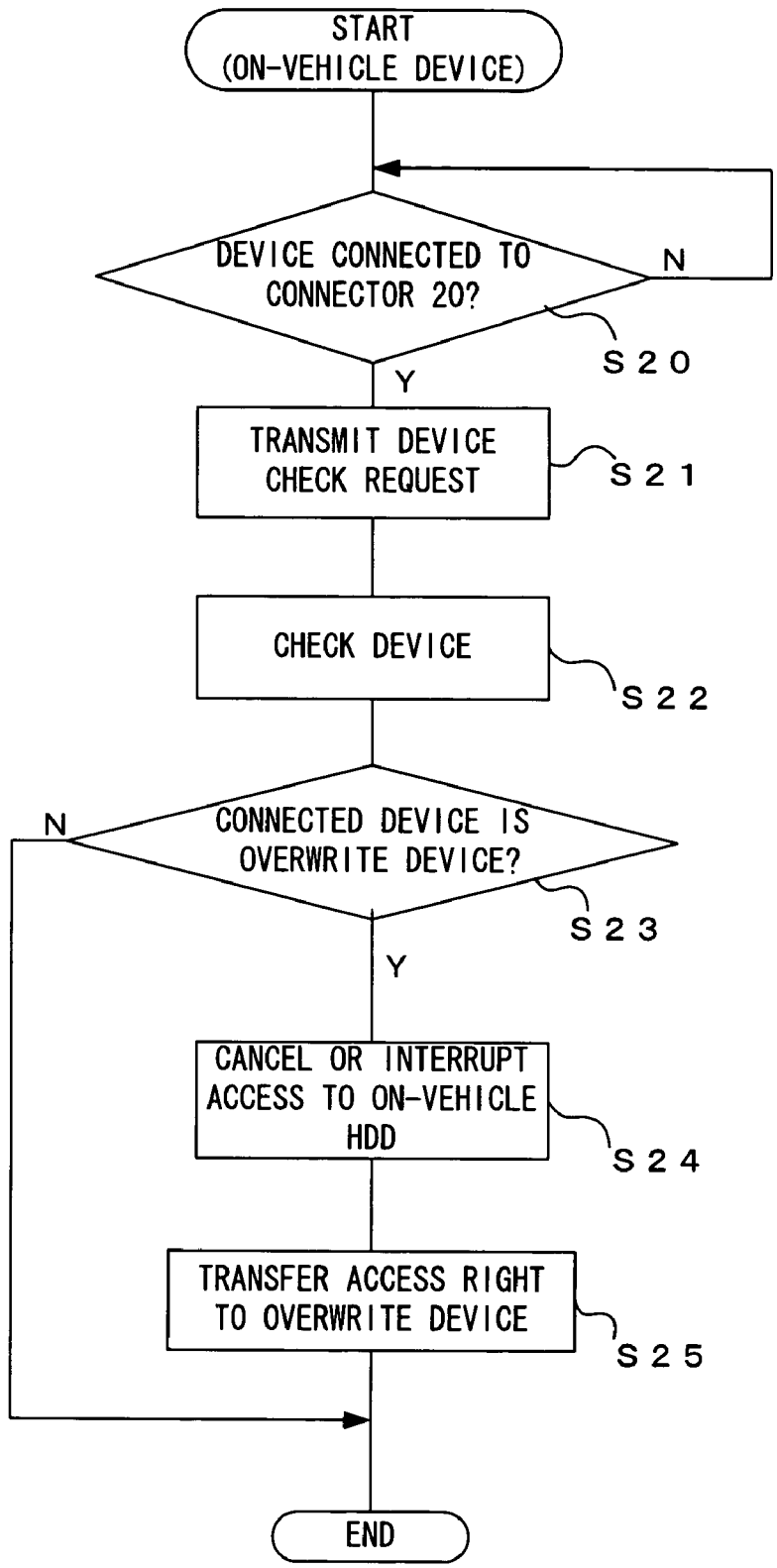
FIG. 5 presents a flowchart of the processing executed at the on-vehicle device in the first embodiment.

FIG. 5 shows the flow of the processing executed at the on-vehicle device 1. This processing flow is executed at all times while the power switch at the on-vehicle device 1 is in an ON state, in conformance to the program executed at the CPU 10. In step S20, a decision is made as to whether or not any device is connected to the connector 20. The operation proceeds to step S21 if it is decided that a device is connected, whereas the processing in step S20 is repeatedly executed if it is decided that no device has been connected. In step S21, a device check request is transmitted to the device determined to be connected in step S20. In the following step S22, a decision is made as to the identity of the connected device based upon the response transmitted in response to the device check request transmitted in step S21. In the following step S23, a decision is made as to whether or not the device identified in step S22 is the overwrite device 2. If it is decided that the device is the overwrite device 2, the operation proceeds to the following step S24. If, on the other hand, it is decided that the device is not the overwrite device 2, the processing flow in FIG. 5 ends, and subsequently, the processing corresponding to the connected device is executed.

In step S24, the processing having been executed up to this point in time for the HDD 17 is terminated. In the following step S25, data indicating that the access right is to be transferred to the overwrite device 2 are transmitted after verifying that the processing at the HDD 17 has ended, and the processing flow shown in FIG. 5 ends.

After the processing in step S25 is executed, the CPU 10 does not access the HDD 17 at all. Based upon the data transmitted in step S25, the overwrite device 2 judges that it has now obtained the access right (step S3 in FIG. 4). Subsequently, the overwrite device 2 changes over the switches 161 and 162 (step S4 in FIG. 4) so that it is enabled to control the HDD 17.

Next, in reference to the flowcharts presented in FIGS. 4 and 5, the operations performed to overwrite data in the HDD 17 from the overwrite device 2 when the on-vehicle device 1 is in various power states are explained.

When the on-vehicle device 1 is in a power ON state, the on-vehicle device 1 executes the processing in steps S20~S25 and transmits the data indicating that the access right is to be transferred to the overwrite device 2. In the meantime, the overwrite device 2 first executes the processing in steps S1 and S2 and then makes an affirmative decision in step S3 based upon the data transmitted from the on-vehicle device 1 in step S25. The overwrite device 2 subsequently rewrites the data in the HDD 17 by executing the processing in step S4 and following steps.

When the on-vehicle device 1 is in a power OFF state, the on-vehicle device 1 does not execute the processing in steps S20~S25. Accordingly, the overwrite device 2 makes a negative decision in step S1 and rewrites the data in the HDD 17 through the processing in step S4 and subsequent steps.

Next, let us consider a situation in which the power at the on-vehicle device 1, which has been on is turned off while the overwrite device 2 is overwriting the data in the HDD 17. The components of the on-vehicle device 1 that are utilized in the processing in step S4 and subsequent steps are the HDD 17 and the switches 161 and 162 only. The power that enables the operations of these components is supplied from the overwrite device 2 even though the switch 6 is in an OFF state, as shown in FIG. 2. For this reason, even if the power at the on-vehicle device 1 is turned off, the HDD 17 keeps operating and the switch settings at the switches 161 and 162 remain unchanged. Thus, the processing executed at the overwrite device 2 in step S4 and subsequent steps is not affected, and the overwrite device 2 is allowed to overwrite the data in the HDD 17 without interference.

Let us now examine a situation in which the power to the on-vehicle device 1 which has been in an OFF state is turned on while executing a data overwrite for the HDD 17. As the power to the on-vehicle device 1 is switched from the OFF state to an ON state, the on-vehicle device 1 first executes the processing in step S20 and makes an affirmative decision. In the following step S21, the on-vehicle device 1 attempts to transmit a device check request to the overwrite device 2. However, the switch 162 has been set to off by the overwrite device 2 in this situation. Thus, the on-vehicle device 1 cannot output any data from the CPU 10 to the overwrite device 2 and for this reason, the device check request cannot be transmitted to the overwrite device 2. Under these circumstances, the on-vehicle device 1 cannot proceed to execute the processing in step S22 and subsequent steps. The overwrite device 2, on the other hand, is allowed to execute the processing in steps S4 and subsequent steps without being affected by the specific statuses of the processing in steps S20~S25. Accordingly, the switches 161 and 162 sustain the current switch settings, and the overwrite device 2 is enabled to overwrite the data in the HDD 17 without interference.

As explained above, the contents of the data in the HDD 17 can be overwritten by employing the overwrite device 2 regardless of whether the power to the on-vehicle device 1 is in an ON state or in an OFF state.

The following advantages are achieved by adopting the data overwrite system in the first embodiment described above.

(1) When the data stored in the HDD 17 of the on-vehicle device 1 are read out or overwritten with the overwrite device 2, the power that the on-vehicle device 1 needs to use is supplied from the overwrite device 2 and the read or the overwrite is executed under control implemented by the overwrite device 2. As a result, the data in the HDD 17 of the on-vehicle device 1 can be read out or overwritten regardless of whether or not the power at the on-vehicle device 1 is in an ON state. In addition, even if the power to the on-vehicle device 1 is switched from an ON state to an OFF state or from an OFF state to an ON state while a read or an overwrite of the data in the HDD 17 of the on-vehicle device 1 is in progress, the read or the overwrite is allowed to proceed without interruption.

(2) The control of the HDD 17 by the CPU 10 of the on-vehicle device 1 is disallowed while the data in the HDD 17 of the on-vehicle device 1 are read out or rewritten. As a result, the CPU 10 is prevented from interfering with the overwrite operation in progress between the overwrite device 2 and the HDD 17.

(3) In addition, while a read or an overwrite of the data in the HDD 17 of the on-vehicle device 1 is in progress, information indicating that a read or an overwrite is in progress is displayed at the display device 18 of the on-vehicle device 1. Furthermore, different display modes are adopted at the display device 18 when the data in the HDD 17 of the on-vehicle device 1 are read out or overwritten by the overwrite device 2 and when the HDD 17 is accessed by the CPU 10 within the on-vehicle device 1. As a result, the user can easily ascertain that a data read or a data overwrite is in progress at the HDD 17 of the on-vehicle device 1 under the control implemented by the overwrite device 2 on the HDD 17.

(4) A connector conforming to the CF specifications for a CF memory card connection or the like is also utilized as the connector 20 used to connect the overwrite device 2 to the on-vehicle device 1. Thus, the overwrite device 2 can be connected to the on-vehicle device 1 readily without having to provide a new connector at the on-vehicle device 1 specifically for connecting the overwrite device 2 to the on-vehicle device 1.

(5) The data direction selector switch 16 provided at the on-vehicle device 1 is used to switch the connections of the HDD 17, from the CPU 10 and the ATA interface 15 of the on-vehicle device 1 to the CPU 21 and the ATA interface 26 of the overwrite device 2. Then the data direction selector switch 16 is changed over in response to a changeover command output from the overwrite device 2, the CPU 21 of the overwrite device 2 recognizes the HDD 27 of the overwrite device 2 as a master HDD and recognizes the HDD 17 of the on-vehicle device 1 as a slave HDD. As a result, the data in the HDD 17 of the on-vehicle device 1 can be read out or overwritten through the operation of the overwrite device 2 alone.

(6) As the changeover command output from the overwrite device 2 to the data direction selector switch 16, a switching key constituted of serial data with a specific bit pattern and a specific clock cycle is used. As a result, any erroneous operation of the data direction selector switch 16 that may otherwise caused by a signal other than the changeover command or noise can be prevented.

It is to be noted that while the connector conforming to the CF specifications is also used as the connector 20 to which the overwrite device 2 is connected in the first embodiment described above, a connector conforming to another set of universal specifications such as the PCMCIA specifications may be used instead as the connector 20 for the overwrite device connection. In addition, while the overwrite data used to update the data in the HDD 17 of the on-vehicle device 1 are supplied from the HDD 27 provided at the overwrite device 2 in the embodiment, the overwrite data may instead be supplied from another storage medium provided at the overwrite device 2 or connected to the overwrite device 2. Such a storage medium may be, for instance, a DVD ROM. Also, while the switching key for the data direction selector switch 16 is constituted of the serial data with a specific bit pattern and a specific clock cycle and is input to the terminal to which the address signal for HDD control is also input, the present invention is not limited to this example, and any of various types of switching keys may be utilized.

Second Embodiment

The second embodiment in which the present invention is adopted in a data overwrite system for a car navigation system is now explained. In the second embodiment, information indicating attributes of the on-vehicle device, such as the manufacturer of the on-vehicle device, the production model number and the device version, is displayed at the overwrite device when data at the on-vehicle device are overwritten with the overwrite device. Such display facilitates the selection of the desired overwrite data from overwrite data corresponding to various types of on-vehicle devices. Since the system configuration is identical to that adopted in the first embodiment, its explanation is omitted.

Figure 6:
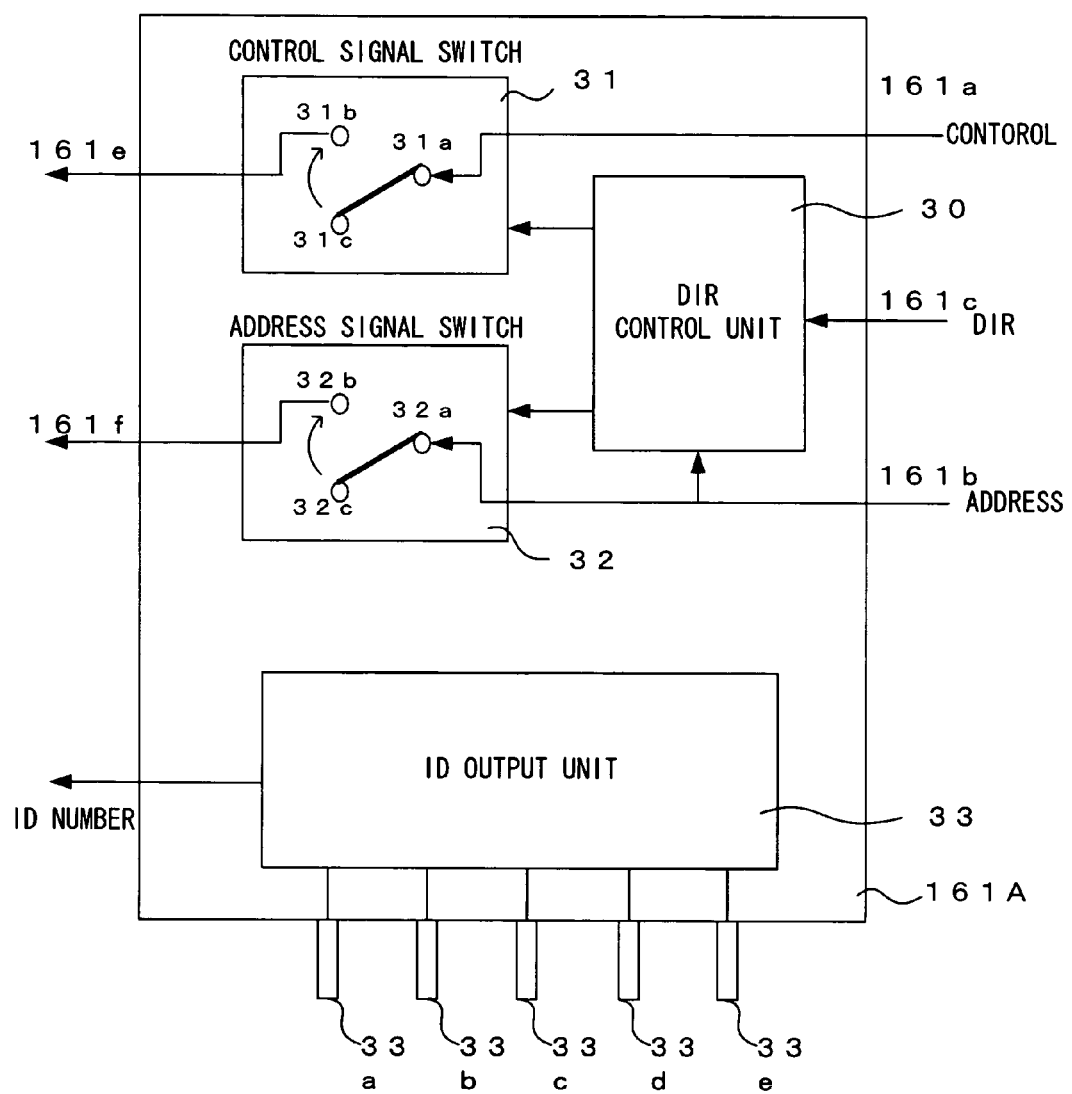
FIG. 6 shows the ID output unit that outputs information indicating the manufacturer of the on-vehicle device, the production model number and the device version in the second embodiment.

FIG. 6 is a functional block diagram of a switch 161A. The switch 161A is utilized in the second embodiment in place of the switch 161 used in the first embodiment. The switch 161A further includes an ID output unit 33 in addition to the components of the switch 161 shown in the functional block diagram presented in FIG. 3. The ID output unit 33 reads the ID number set at ID terminals 33a~33e and outputs the ID number thus read to the overwrite device 2. The overwrite device 2 determines the manufacturer of the on-vehicle device 1, the production model number, the device version and the like based upon the ID number output from the ID output unit 33 and displays the information at the display monitor 25.

The switch 161A is realized as an integrated circuit, and the ID terminals 33a~33e correspond to the individual pins at the integrated circuit. The ID number is provided as a 5-digit binary number with the value at each digit indicating the level of one of the voltages supplied to the ID terminals (pins) 33a~33e. It is assumed that in this example, the pins 33a and 33b indicate the ID number of the manufacturer and the pins 33c~33e indicate the production model number of the device and the version ID number. In such a case, the ID number indicates one of four different manufacturers and one of eight combinations of production model numbers and device versions.

Figure 7:
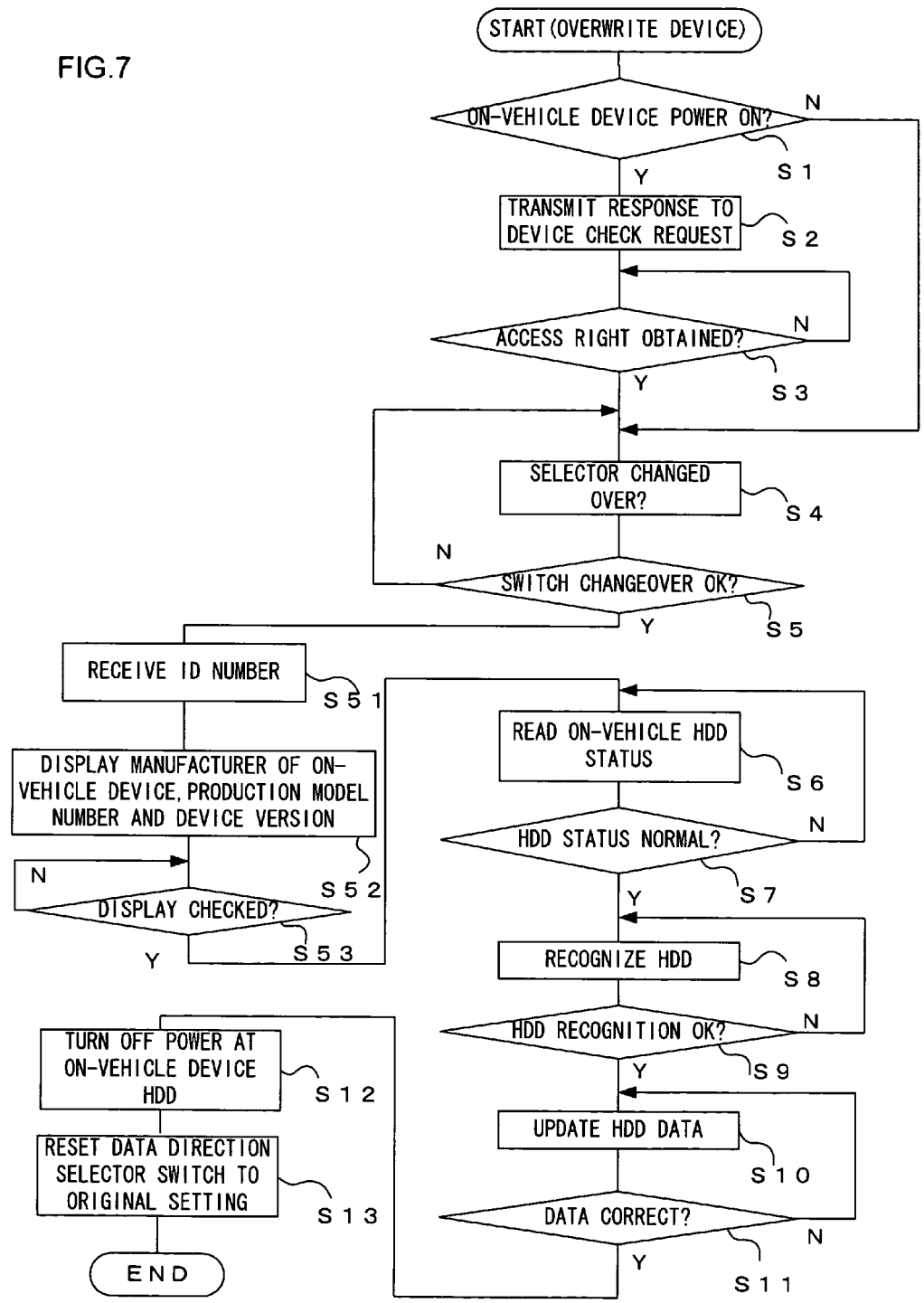
FIG. 7 presents a flowchart of the processing executed at the overwrite device in the second embodiment.

FIG. 7 shows the flow of the processing executed at the overwrite device 2 in the data overwrite system in the second embodiment. This processing flow is executed when the overwrite device 2 is connected to the connector 20 of the on-vehicle device 1, in conformance to the program executed at the CPU 21, as in the first embodiment. In steps S1~S5, processing similar to that implemented in the first embodiment is executed.

In step S51, the ID number is received from the switch 161A of the on-vehicle device 1. In the following step S52, the manufacturer of the on-vehicle device 1, the production model number and the device version are displayed at the display monitor 25 based upon the ID number received from the switch 161A in step S51. In step S53, a decision is made as to whether or not the operator of the overwrite device 2 has verified the manufacturer, the production model number and the device version displayed in step S52. This decision may be made by ascertaining, for instance, whether or not an input key (not shown) has been operated by the operator. The operation proceeds to the following step S6 if it is decided that the information has been verified, whereas the processing in step S53 is repeatedly executed if it is decided that the information has not been verified. Processing identical to that in the first embodiment is executed in step S6 and subsequent steps. The information indicating the manufacturer of the on-vehicle device 1, the production model number and the device version is displayed at the overwrite device 2 as described above so as to allow the operator of the overwrite device 2 to verify the information.

The data overwrite system in the second embodiment described above achieves the following advantage in addition to the advantages of the data overwrite system in the first embodiment. The information indicating the attributes of the on-vehicle device 1 is displayed at the screen of the overwrite device 2 based upon the ID number output from the on-vehicle device 1. As a result, the operator of the overwrite device 2 is enabled to speedily select the desired overwrite data from overwrite data corresponding to the various types of on-vehicle devices.

It is to be noted that while the ID number is provided as a 5-digit binary number, with two of the five digits indicating the ID number of the manufacturer of the on-vehicle device 1 and the remaining three digits indicating the production model number and the device version ID number of the on-vehicle device 1 in the second embodiment described above, the numbers of digits used for specific ID representations are not limited to this example. In addition, while the manufacturer, the production model number and the device version are displayed as the information indicating the attributes of the on-vehicle device 1, information indicating other attributes may be displayed instead. Furthermore, while the ID number is output from the switch 161A at the data direction selector switch 16, which is used to switch the recipient to which the control signal and the address signal are output in the embodiment described above, the ID number may be output from another component of the on-vehicle device 1 instead.

While the explanation has been given in reference to the embodiments by focusing on the operation executed to overwrite the data at the on-vehicle device 1 with the overwrite device 2, this operation simply represents an example of application of the present invention, and the present invention may be adopted in conjunction with an additional read function, or the data in the on-vehicle device 1 may be read out by using a dedicated data read device instead of the overwrite device 2. The individual components and the operations thereof are not limited to any specific details explained in reference to the embodiments, as long as the characteristics of the present invention remain intact.

The above described embodiments are examples, and various modifications can be made without departing from the spirit and scope of the invention.

What is claimed is:

1. A data access method for accessing data in an on-vehicle information device having an on-vehicle memory unit that allows data stored therein to be read out and overwritten by an external apparatus and an on-vehicle control unit that executes a data read and a data overwrite by controlling the on-vehicle memory unit, comprising:
   reading out and overwriting the data in the on-vehicle memory unit through control implemented by the external apparatus while supplying power to the on-vehicle information devices from the external apparatus when a power switch at the on-vehicle information device is in an OFF state.

2. A data access method according to claim 1, further comprising:
   controlling the on-vehicle memory unit by the on-vehicle control unit until a data read or a data overwrite is started by the external apparatus when the power switch of the on-vehicle information device is in an ON state, and
   controlling the on-vehicle memory unit to read out and overwrite the data through control implemented by the external apparatus once the data read or the data overwrite is started by the external apparatus.

3. A data access method according to claim 1, further comprising:
   inhibiting the on-vehicle control unit from controlling the on-vehicle memory unit when the data in the on-vehicle memory unit are read out or rewritten through control implemented by the external apparatus.

4. A data access method according to claim 1, further comprising:
   indicating the state of control in which the on-vehicle memory unit is controlled by the external apparatus when data in the on-vehicle memory unit are read out or overwritten through control implemented by the external apparatus.

5. A data access method according to claim 1, wherein:
   the information device is connected with the external apparatus via a mounting slot for a portable external storage device.

6. A data access system comprising:
   an on-vehicle information device having an on-vehicle memory unit that allows data stored therein to be read and overwritten from the outside, an on-vehicle control unit that executes a data read out and a data overwrite by controlling the on-vehicle memory unit and an on-vehicle interface unit that executes conversion of a control signal exchanged between the on-vehicle memory unit and the on-vehicle control unit; and
   a data access apparatus having an external memory unit having stored therein data to be used to overwrite data in the on-vehicle memory unit, an external control unit that reads out data in the on-vehicle memory unit and overwrites the data in the on-vehicle memory unit with data in the external memory unit by controlling the external memory unit and the on-vehicle memory unit, and an external interface unit that converts a control signal input and output between the external memory unit and the on-vehicle control unit and between the on-vehicle memory unit and the on-vehicle control unit, wherein:
   the information device further includes a selector switch that selects the on-vehicle control unit and the on-vehicle interface unit to be connected with the on-vehicle memory unit until the data access apparatus outputs a changeover command and allows the external control unit and the external interface unit to be connected with the on-vehicle memory unit after the changeover command is output.

* * * * *